US008831334B2

(12) United States Patent
Luo et al.

(10) Patent No.: US 8,831,334 B2
(45) Date of Patent: Sep. 9, 2014

(54) SEGMENTATION FOR WAFER INSPECTION (71) Applicant: KLA-Tencor Corporation, Milpitas, CA (US)

(72) Inventors: Tao Luo, Fremont, CA (US); Yong Zhang, Cupertino, CA (US); Stephanie Chen, Fremont, CA (US)

(73) Assignee: KLA-Tencor Corp., Milpitas, CA (US)

( * ) Notice: Subject to any disclaimer, the term of this patent is extended or adjusted under 35 U.S.C. 154(b) by 29 days.

(21) Appl. No.: 13/742,259

(22) Filed: Jan. 15, 2013

(65) Prior Publication Data

US 2013/0188859 A1 Jul. 25, 2013

Related U.S. Application Data (60) Provisional application No. 61/588,871, filed on Jan. 20, 2012.

(51) Int. Cl.
G06T 7/00 (2006.01)
(52) U.S. Cl.
CPC ..... *G06T 7/0002* (2013.01); *G06T 2207/20076* (2013.01); *G06T 7/0004* (2013.01); *G06T 2207/30148* (2013.01); *G06T 7/0087* (2013.01); *G06T 7/0085* (2013.01)
USPC ............................ 382/149; 382/173; 382/262
(58) Field of Classification Search
None
See application file for complete search history.

(56) References Cited

U.S. PATENT DOCUMENTS

| 3,495,269 A | 2/1970 | Mutschler et al. |
| 3,496,352 A | 2/1970 | Jugle |
| 3,909,602 A | 9/1975 | Micka |
| 4,015,203 A | 3/1977 | Verkuil |
| 4,247,203 A | 1/1981 | Levy et al. |
| 4,347,001 A | 8/1982 | Levy et al. |
| 4,378,159 A | 3/1983 | Galbraith |

(Continued)

FOREIGN PATENT DOCUMENTS

| CN | 1339140 | 3/2002 |
| CN | 1398348 | 2/2003 |

(Continued)

OTHER PUBLICATIONS

Jing-Ming Guo, "License Plate Localization and Character Segmentation With Feedback Self-Learning and Hybrid Binarization Techniques", IEEE Transactions on Vehicular Technology, vol. 57, No. 3, May 2008, pp. 1417-1424.*

(Continued)

*Primary Examiner* — Brian P Werner
(74) *Attorney, Agent, or Firm* — Ann Marie Mewherter (57) ABSTRACT

Methods and systems for segmenting pixels for wafer inspection are provided. One method includes determining a statistic for individual pixels based on a characteristic of the individual pixels in an image acquired for a wafer by an inspection system. The method also includes assigning the individual pixels to first segments based on the statistic. In addition, the method includes detecting one or more edges between the first segments in an image of the first segments and generating an edge map by projecting the one or more edges across an area corresponding to the image for the wafer. The method further includes assigning the individual pixels to second segments by applying the first segments and the edge map to the image for the wafer thereby segmenting the image. Defect detection is performed based on the second segments to which the individual pixels are assigned.

20 Claims, 2 Drawing Sheets

(56) References Cited

U.S. PATENT DOCUMENTS

| | | |
|---|---|---|
| 4,448,532 A | 5/1984 | Joseph et al. |
| 4,475,122 A | 10/1984 | Green |
| 4,532,650 A | 7/1985 | Wihl et al. |
| 4,555,798 A | 11/1985 | Broadbent, Jr. et al. |
| 4,578,810 A | 3/1986 | MacFarlane et al. |
| 4,579,455 A | 4/1986 | Levy et al. |
| 4,595,289 A | 6/1986 | Feldman et al. |
| 4,599,558 A | 7/1986 | Castellano, Jr. et al. |
| 4,633,504 A | 12/1986 | Wihl |
| 4,641,353 A | 2/1987 | Kobayashi |
| 4,641,967 A | 2/1987 | Pecen |
| 4,734,721 A | 3/1988 | Boyer et al. |
| 4,748,327 A | 5/1988 | Shinozaki et al. |
| 4,758,094 A | 7/1988 | Wihl et al. |
| 4,766,324 A | 8/1988 | Saadat et al. |
| 4,799,175 A | 1/1989 | Sano et al. |
| 4,805,123 A | 2/1989 | Specht et al. |
| 4,812,756 A | 3/1989 | Curtis et al. |
| 4,814,829 A | 3/1989 | Kosugi et al. |
| 4,817,123 A | 3/1989 | Sones et al. |
| 4,845,558 A | 7/1989 | Tsai et al. |
| 4,877,326 A | 10/1989 | Chadwick et al. |
| 4,926,489 A | 5/1990 | Danielson et al. |
| 4,928,313 A | 5/1990 | Leonard et al. |
| 5,046,109 A | 9/1991 | Fujimori et al. |
| 5,124,927 A | 6/1992 | Hopewell et al. |
| 5,189,481 A | 2/1993 | Jann et al. |
| 5,355,212 A | 10/1994 | Wells et al. |
| 5,444,480 A | 8/1995 | Sumita |
| 5,453,844 A | 9/1995 | George et al. |
| 5,481,624 A | 1/1996 | Kamon |
| 5,485,091 A | 1/1996 | Verkuil |
| 5,497,381 A | 3/1996 | O'Donoghue et al. |
| 5,528,153 A | 6/1996 | Taylor et al. |
| 5,544,256 A | 8/1996 | Brecher et al. |
| 5,563,702 A | 10/1996 | Emery et al. |
| 5,572,598 A | 11/1996 | Wihl et al. |
| 5,578,821 A | 11/1996 | Meisberger et al. |
| 5,594,247 A | 1/1997 | Verkuil et al. |
| 5,608,538 A | 3/1997 | Edgar et al. |
| 5,619,548 A | 4/1997 | Koppel |
| 5,621,519 A | 4/1997 | Frost et al. |
| 5,644,223 A | 7/1997 | Verkuil |
| 5,650,731 A | 7/1997 | Fung et al. |
| 5,661,408 A | 8/1997 | Kamieniecki et al. |
| 5,689,614 A | 11/1997 | Gronet et al. |
| 5,694,478 A | 12/1997 | Braier et al. |
| 5,696,835 A | 12/1997 | Hennessey et al. |
| 5,703,969 A | 12/1997 | Hennessey et al. |
| 5,737,072 A | 4/1998 | Emery et al. |
| 5,742,658 A | 4/1998 | Tiffin et al. |
| 5,754,678 A | 5/1998 | Hawthorne et al. |
| 5,767,691 A | 6/1998 | Verkuil |
| 5,767,693 A | 6/1998 | Verkuil |
| 5,771,317 A | 6/1998 | Edgar |
| 5,773,989 A | 6/1998 | Edelman et al. |
| 5,774,179 A | 6/1998 | Chevrette et al. |
| 5,795,685 A | 8/1998 | Liebmann et al. |
| 5,822,218 A | 10/1998 | Moosa et al. |
| 5,831,865 A | 11/1998 | Berezin et al. |
| 5,834,941 A | 11/1998 | Verkuil |
| 5,852,232 A | 12/1998 | Samsavar et al. |
| 5,866,806 A | 2/1999 | Samsavar et al. |
| 5,874,733 A | 2/1999 | Silver et al. |
| 5,884,242 A | 3/1999 | Meier et al. |
| 5,889,593 A | 3/1999 | Bareket |
| 5,917,332 A | 6/1999 | Chen et al. |
| 5,932,377 A | 8/1999 | Ferguson et al. |
| 5,940,458 A | 8/1999 | Suk |
| 5,948,972 A | 9/1999 | Samsavar et al. |
| 5,955,661 A | 9/1999 | Samsavar et al. |
| 5,965,306 A | 10/1999 | Mansfield et al. |
| 5,978,501 A | 11/1999 | Badger et al. |
| 5,980,187 A | 11/1999 | Verhovsky |
| 5,986,263 A | 11/1999 | Hiroi et al. |
| 5,991,699 A | 11/1999 | Kulkarni et al. |
| 5,999,003 A | 12/1999 | Steffan et al. |
| 6,011,404 A | 1/2000 | Ma et al. |
| 6,014,461 A | 1/2000 | Hennessey et al. |
| 6,040,912 A | 3/2000 | Zika et al. |
| 6,052,478 A | 4/2000 | Wihl et al. |
| 6,060,709 A | 5/2000 | Verkuil et al. |
| 6,072,320 A | 6/2000 | Verkuil |
| 6,076,465 A | 6/2000 | Vacca et al. |
| 6,078,738 A | 6/2000 | Garza et al. |
| 6,091,257 A | 7/2000 | Verkuil et al. |
| 6,091,846 A | 7/2000 | Lin et al. |
| 6,097,196 A | 8/2000 | Verkuil et al. |
| 6,097,887 A | 8/2000 | Hardikar et al. |
| 6,104,206 A | 8/2000 | Verkuil |
| 6,104,835 A | 8/2000 | Han |
| 6,117,598 A | 9/2000 | Imai |
| 6,121,783 A | 9/2000 | Horner et al. |
| 6,122,017 A | 9/2000 | Taubman |
| 6,122,046 A | 9/2000 | Almogy |
| 6,137,570 A | 10/2000 | Chuang et al. |
| 6,141,038 A | 10/2000 | Young et al. |
| 6,146,627 A | 11/2000 | Muller et al. |
| 6,171,737 B1 | 1/2001 | Phan et al. |
| 6,175,645 B1 | 1/2001 | Elyasaf et al. |
| 6,184,929 B1 | 2/2001 | Noda et al. |
| 6,184,976 B1 | 2/2001 | Park et al. |
| 6,191,605 B1 | 2/2001 | Miller et al. |
| 6,201,999 B1 | 3/2001 | Jevtic |
| 6,202,029 B1 | 3/2001 | Verkuil et al. |
| 6,205,239 B1 | 3/2001 | Lin et al. |
| 6,215,551 B1 | 4/2001 | Nikoonahad et al. |
| 6,224,638 B1 | 5/2001 | Jevtic et al. |
| 6,233,719 B1 | 5/2001 | Hardikar et al. |
| 6,246,787 B1 | 6/2001 | Hennessey et al. |
| 6,248,485 B1 | 6/2001 | Cuthbert |
| 6,248,486 B1 | 6/2001 | Dirksen et al. |
| 6,259,960 B1 | 7/2001 | Inokuchi |
| 6,266,437 B1 | 7/2001 | Eichel et al. |
| 6,267,005 B1 | 7/2001 | Samsavar et al. |
| 6,268,093 B1 | 7/2001 | Kenan et al. |
| 6,272,236 B1 | 8/2001 | Pierrat et al. |
| 6,282,309 B1 | 8/2001 | Emery |
| 6,292,582 B1 | 9/2001 | Lin et al. |
| 6,324,298 B1 | 11/2001 | O'Dell et al. |
| 6,344,640 B1 | 2/2002 | Rhoads |
| 6,363,166 B1 | 3/2002 | Wihl et al. |
| 6,373,975 B1 | 4/2002 | Bula et al. |
| 6,388,747 B2 | 5/2002 | Nara et al. |
| 6,393,602 B1 | 5/2002 | Atchison et al. |
| 6,407,373 B1 | 6/2002 | Dotan |
| 6,415,421 B2 | 7/2002 | Anderson et al. |
| 6,445,199 B1 | 9/2002 | Satya et al. |
| 6,451,690 B1 | 9/2002 | Matsumoto et al. |
| 6,459,520 B1 | 10/2002 | Takayama |
| 6,466,314 B1 | 10/2002 | Lehman |
| 6,466,315 B1 | 10/2002 | Karpol et al. |
| 6,470,489 B1 | 10/2002 | Chang et al. |
| 6,483,938 B1 | 11/2002 | Hennessey et al. |
| 6,513,151 B1 | 1/2003 | Erhardt et al. |
| 6,526,164 B1 | 2/2003 | Mansfield et al. |
| 6,529,621 B1 | 3/2003 | Glasser et al. |
| 6,535,628 B2 | 3/2003 | Smargiassi et al. |
| 6,539,106 B1 | 3/2003 | Gallarda et al. |
| 6,569,691 B1 | 5/2003 | Jastrzebski et al. |
| 6,581,193 B1 | 6/2003 | McGhee et al. |
| 6,593,748 B1 | 7/2003 | Halliyal et al. |
| 6,597,193 B2 | 7/2003 | Lagowski et al. |
| 6,602,728 B1 | 8/2003 | Liebmann et al. |
| 6,608,681 B2 | 8/2003 | Tanaka et al. |
| 6,614,520 B1 | 9/2003 | Bareket et al. |
| 6,631,511 B2 | 10/2003 | Haffner et al. |
| 6,636,301 B1 | 10/2003 | Kvamme et al. |
| 6,642,066 B1 | 11/2003 | Halliyal et al. |
| 6,658,640 B2 | 12/2003 | Weed |
| 6,665,065 B1 | 12/2003 | Phan et al. |
| 6,670,082 B2 | 12/2003 | Liu et al. |
| 6,680,621 B2 | 1/2004 | Savtchouk |
| 6,691,052 B1 | 2/2004 | Maurer |

(56) References Cited

U.S. PATENT DOCUMENTS

| | | |
|---|---|---|
| 6,701,004 B1 | 3/2004 | Shykind et al. |
| 6,718,526 B1 | 4/2004 | Eldredge et al. |
| 6,721,695 B1 | 4/2004 | Chen et al. |
| 6,734,696 B2 | 5/2004 | Horner et al. |
| 6,738,954 B1 | 5/2004 | Allen et al. |
| 6,748,103 B2 | 6/2004 | Glasser et al. |
| 6,751,519 B1 | 6/2004 | Satya et al. |
| 6,753,954 B2 | 6/2004 | Chen |
| 6,757,645 B2 | 6/2004 | Chang et al. |
| 6,759,655 B2 | 7/2004 | Nara et al. |
| 6,771,806 B1 | 8/2004 | Satya et al. |
| 6,775,818 B2 | 8/2004 | Taravade et al. |
| 6,777,147 B1 | 8/2004 | Fonseca et al. |
| 6,777,676 B1 | 8/2004 | Wang et al. |
| 6,778,695 B1 | 8/2004 | Schellenberg et al. |
| 6,779,159 B2 | 8/2004 | Yokoyama et al. |
| 6,784,446 B1 | 8/2004 | Phan et al. |
| 6,788,400 B2 | 9/2004 | Chen |
| 6,789,032 B2 | 9/2004 | Barbour et al. |
| 6,803,554 B2 | 10/2004 | Ye et al. |
| 6,806,456 B1 | 10/2004 | Ye et al. |
| 6,807,503 B2 | 10/2004 | Ye et al. |
| 6,813,572 B2 | 11/2004 | Satya et al. |
| 6,820,028 B2 | 11/2004 | Ye et al. |
| 6,828,542 B2 | 12/2004 | Ye et al. |
| 6,842,225 B1 | 1/2005 | Irie et al. |
| 6,859,746 B1 | 2/2005 | Stirton |
| 6,879,403 B2 | 4/2005 | Freifeld |
| 6,879,924 B2 | 4/2005 | Ye et al. |
| 6,882,745 B2 | 4/2005 | Brankner et al. |
| 6,884,984 B2 | 4/2005 | Ye et al. |
| 6,886,153 B1 | 4/2005 | Bevis |
| 6,892,156 B2 | 5/2005 | Ye et al. |
| 6,902,855 B2 | 6/2005 | Peterson et al. |
| 6,906,305 B2 | 6/2005 | Pease et al. |
| 6,918,101 B1 | 7/2005 | Satya et al. |
| 6,919,957 B2 | 7/2005 | Nikoonahad et al. |
| 6,937,753 B1 | 8/2005 | O'Dell et al. |
| 6,948,141 B1 | 9/2005 | Satya et al. |
| 6,959,255 B2 | 10/2005 | Ye et al. |
| 6,966,047 B1 | 11/2005 | Glasser |
| 6,969,837 B2 | 11/2005 | Ye et al. |
| 6,969,864 B2 | 11/2005 | Ye et al. |
| 6,983,060 B1 | 1/2006 | Martinent-Catalot et al. |
| 6,988,045 B2 | 1/2006 | Purdy |
| 7,003,755 B2 | 2/2006 | Pang et al. |
| 7,003,758 B2 | 2/2006 | Ye et al. |
| 7,012,438 B1 | 3/2006 | Miller et al. |
| 7,026,615 B2 | 4/2006 | Takane et al. |
| 7,027,143 B1 | 4/2006 | Stokowski et al. |
| 7,030,966 B2 | 4/2006 | Hansen |
| 7,030,997 B2 | 4/2006 | Neureuther et al. |
| 7,053,355 B2 | 5/2006 | Ye et al. |
| 7,061,625 B1 | 6/2006 | Hwang et al. |
| 7,071,833 B2 | 7/2006 | Nagano et al. |
| 7,103,484 B1 | 9/2006 | Shi et al. |
| 7,106,895 B1 | 9/2006 | Goldberg et al. |
| 7,107,517 B1 | 9/2006 | Suzuki et al. |
| 7,107,571 B2 | 9/2006 | Chang et al. |
| 7,111,277 B2 | 9/2006 | Ye et al. |
| 7,114,143 B2 | 9/2006 | Hanson et al. |
| 7,114,145 B2 | 9/2006 | Ye et al. |
| 7,117,477 B2 | 10/2006 | Ye et al. |
| 7,117,478 B2 | 10/2006 | Ye et al. |
| 7,120,285 B1 | 10/2006 | Spence |
| 7,120,895 B2 | 10/2006 | Ye et al. |
| 7,123,356 B1 | 10/2006 | Stokowski et al. |
| 7,124,386 B2 | 10/2006 | Smith et al. |
| 7,133,548 B2 | 11/2006 | Kenan et al. |
| 7,135,344 B2 | 11/2006 | Nehmadi et al. |
| 7,136,143 B2 | 11/2006 | Smith |
| 7,152,215 B2 | 12/2006 | Smith et al. |
| 7,162,071 B2 | 1/2007 | Hung et al. |
| 7,171,334 B2 | 1/2007 | Gassner |
| 7,174,520 B2 | 2/2007 | White et al. |
| 7,194,709 B2 | 3/2007 | Brankner |
| 7,207,017 B1 | 4/2007 | Tabery et al. |
| 7,231,628 B2 | 6/2007 | Pack et al. |
| 7,236,847 B2 | 6/2007 | Marella |
| 7,271,891 B1 | 9/2007 | Xiong et al. |
| 7,379,175 B1 | 5/2008 | Stokowski et al. |
| 7,383,156 B2 | 6/2008 | Matsusita et al. |
| 7,386,839 B1 | 6/2008 | Golender et al. |
| 7,388,979 B2 | 6/2008 | Sakai et al. |
| 7,418,124 B2 | 8/2008 | Peterson et al. |
| 7,424,145 B2 | 9/2008 | Horie et al. |
| 7,440,093 B1 | 10/2008 | Xiong et al. |
| 7,570,796 B2 | 8/2009 | Zafar et al. |
| 7,676,077 B2 | 3/2010 | Kulkarni et al. |
| 7,683,319 B2 | 3/2010 | Makino et al. |
| 7,738,093 B2 | 6/2010 | Alles et al. |
| 7,739,064 B1 | 6/2010 | Ryker et al. |
| 7,760,929 B2 | 7/2010 | Orbon et al. |
| 7,769,225 B2 | 8/2010 | Kekare et al. |
| 7,877,722 B2 | 1/2011 | Duffy et al. |
| 7,890,917 B1 | 2/2011 | Young et al. |
| 7,904,845 B2 | 3/2011 | Fouquet et al. |
| 7,968,859 B2 | 6/2011 | Young et al. |
| 8,041,103 B2 | 10/2011 | Kulkarni et al. |
| 8,073,240 B2 | 12/2011 | Fischer et al. |
| 8,112,241 B2 | 2/2012 | Xiong |
| 8,126,255 B2 | 2/2012 | Bhaskar et al. |
| 8,204,297 B1 | 6/2012 | Xiong et al. |
| 8,611,639 B2 * | 12/2013 | Kulkarni et al. .............. 382/149 |
| 2001/0017694 A1 | 8/2001 | Oomori et al. |
| 2001/0019625 A1 | 9/2001 | Kenan et al. |
| 2001/0022858 A1 | 9/2001 | Komiya et al. |
| 2001/0043735 A1 | 11/2001 | Smargiassi et al. |
| 2002/0010560 A1 | 1/2002 | Balachandran |
| 2002/0019729 A1 | 2/2002 | Chang et al. |
| 2002/0026626 A1 | 2/2002 | Randall et al. |
| 2002/0033449 A1 | 3/2002 | Nakasuji et al. |
| 2002/0035461 A1 | 3/2002 | Chang et al. |
| 2002/0035641 A1 | 3/2002 | Kurose et al. |
| 2002/0035717 A1 | 3/2002 | Matsuoka |
| 2002/0088951 A1 | 7/2002 | Chen |
| 2002/0090746 A1 | 7/2002 | Xu et al. |
| 2002/0134936 A1 | 9/2002 | Matsui et al. |
| 2002/0144230 A1 | 10/2002 | Rittman |
| 2002/0145734 A1 | 10/2002 | Watkins et al. |
| 2002/0164065 A1 | 11/2002 | Cai et al. |
| 2002/0176096 A1 | 11/2002 | Sentoku et al. |
| 2002/0181756 A1 | 12/2002 | Shibuya et al. |
| 2002/0186878 A1 | 12/2002 | Hoon et al. |
| 2002/0192578 A1 | 12/2002 | Tanaka et al. |
| 2003/0004699 A1 | 1/2003 | Choi et al. |
| 2003/0014146 A1 | 1/2003 | Fujii et al. |
| 2003/0017664 A1 | 1/2003 | Pnueli et al. |
| 2003/0022401 A1 | 1/2003 | Hamamatsu et al. |
| 2003/0033046 A1 | 2/2003 | Yoshitake et al. |
| 2003/0048458 A1 | 3/2003 | Mieher et al. |
| 2003/0048939 A1 | 3/2003 | Lehman |
| 2003/0057971 A1 | 3/2003 | Nishiyama et al. |
| 2003/0076989 A1 * | 4/2003 | Maayah et al. .............. 382/145 |
| 2003/0086081 A1 | 5/2003 | Lehman |
| 2003/0094572 A1 | 5/2003 | Matsui et al. |
| 2003/0098805 A1 | 5/2003 | Bizjak et al. |
| 2003/0128870 A1 | 7/2003 | Pease et al. |
| 2003/0138138 A1 | 7/2003 | Vacca et al. |
| 2003/0138978 A1 | 7/2003 | Tanaka et al. |
| 2003/0169916 A1 | 9/2003 | Hayashi et al. |
| 2003/0173516 A1 | 9/2003 | Takane et al. |
| 2003/0192015 A1 | 10/2003 | Liu |
| 2003/0207475 A1 | 11/2003 | Nakasuji et al. |
| 2003/0223639 A1 | 12/2003 | Shlain et al. |
| 2003/0226951 A1 | 12/2003 | Ye et al. |
| 2003/0227620 A1 | 12/2003 | Yokoyama et al. |
| 2003/0228714 A1 | 12/2003 | Smith et al. |
| 2003/0229410 A1 | 12/2003 | Smith et al. |
| 2003/0229412 A1 | 12/2003 | White et al. |
| 2003/0229868 A1 | 12/2003 | White et al. |
| 2003/0229875 A1 | 12/2003 | Smith et al. |
| 2003/0229880 A1 | 12/2003 | White et al. |
| 2003/0229881 A1 | 12/2003 | White et al. |

(56) References Cited

U.S. PATENT DOCUMENTS

| | | |
|---|---|---|
| 2003/0237064 A1 | 12/2003 | White et al. |
| 2004/0030430 A1 | 2/2004 | Matsuoka |
| 2004/0032908 A1 | 2/2004 | Hagai et al. |
| 2004/0049722 A1 | 3/2004 | Matsushita |
| 2004/0052411 A1 | 3/2004 | Qian et al. |
| 2004/0057611 A1 | 3/2004 | Lee et al. |
| 2004/0066506 A1 | 4/2004 | Elichai et al. |
| 2004/0091142 A1 | 5/2004 | Peterson et al. |
| 2004/0094762 A1 | 5/2004 | Hess et al. |
| 2004/0098216 A1 | 5/2004 | Ye et al. |
| 2004/0102934 A1 | 5/2004 | Chang |
| 2004/0107412 A1 | 6/2004 | Pack et al. |
| 2004/0119036 A1 | 6/2004 | Ye et al. |
| 2004/0120569 A1 | 6/2004 | Hung et al. |
| 2004/0133369 A1 | 7/2004 | Pack et al. |
| 2004/0147121 A1 | 7/2004 | Nakagaki et al. |
| 2004/0174506 A1 | 9/2004 | Smith |
| 2004/0179738 A1 | 9/2004 | Dai et al. |
| 2004/0199885 A1 | 10/2004 | Lu et al. |
| 2004/0223639 A1 | 11/2004 | Sato et al. |
| 2004/0228515 A1 | 11/2004 | Okabe et al. |
| 2004/0234120 A1 | 11/2004 | Honda et al. |
| 2004/0243320 A1 | 12/2004 | Chang et al. |
| 2004/0246476 A1 | 12/2004 | Bevis et al. |
| 2004/0254752 A1 | 12/2004 | Wisniewski et al. |
| 2005/0004774 A1 | 1/2005 | Volk et al. |
| 2005/0008218 A1 | 1/2005 | O'Dell et al. |
| 2005/0010890 A1 | 1/2005 | Nehmadi et al. |
| 2005/0013474 A1* | 1/2005 | Sim ................ 382/145 |
| 2005/0062962 A1 | 3/2005 | Fairley et al. |
| 2005/0069217 A1 | 3/2005 | Mukherjee |
| 2005/0117796 A1 | 6/2005 | Matsui et al. |
| 2005/0132306 A1 | 6/2005 | Smith et al. |
| 2005/0141764 A1 | 6/2005 | Tohyama et al. |
| 2005/0166174 A1 | 7/2005 | Ye et al. |
| 2005/0184252 A1 | 8/2005 | Ogawa et al. |
| 2005/0190957 A1 | 9/2005 | Cai et al. |
| 2005/0198602 A1 | 9/2005 | Brankner et al. |
| 2006/0000964 A1 | 1/2006 | Ye et al. |
| 2006/0036979 A1 | 2/2006 | Zurbrick et al. |
| 2006/0038986 A1 | 2/2006 | Honda et al. |
| 2006/0048089 A1 | 3/2006 | Schwarzband |
| 2006/0051682 A1 | 3/2006 | Hess et al. |
| 2006/0062445 A1 | 3/2006 | Verma et al. |
| 2006/0066339 A1 | 3/2006 | Rajski et al. |
| 2006/0082763 A1 | 4/2006 | Teh et al. |
| 2006/0159333 A1 | 7/2006 | Ishikawa |
| 2006/0161452 A1 | 7/2006 | Hess |
| 2006/0193506 A1 | 8/2006 | Dorphan et al. |
| 2006/0193507 A1 | 8/2006 | Sali et al. |
| 2006/0236294 A1 | 10/2006 | Saidin et al. |
| 2006/0236297 A1 | 10/2006 | Melvin, III et al. |
| 2006/0239536 A1 | 10/2006 | Shibuya et al. |
| 2006/0265145 A1 | 11/2006 | Huet et al. |
| 2006/0266243 A1 | 11/2006 | Percin et al. |
| 2006/0269120 A1 | 11/2006 | Nehmadi et al. |
| 2006/0273242 A1 | 12/2006 | Hunsche et al. |
| 2006/0273266 A1 | 12/2006 | Preil et al. |
| 2006/0277520 A1 | 12/2006 | Gennari |
| 2006/0291714 A1 | 12/2006 | Wu et al. |
| 2006/0292463 A1 | 12/2006 | Best et al. |
| 2007/0002322 A1 | 1/2007 | Borodovsky et al. |
| 2007/0011628 A1 | 1/2007 | Ouali et al. |
| 2007/0013901 A1 | 1/2007 | Kim et al. |
| 2007/0019171 A1 | 1/2007 | Smith |
| 2007/0019856 A1 | 1/2007 | Furman et al. |
| 2007/0031745 A1 | 2/2007 | Ye et al. |
| 2007/0032896 A1 | 2/2007 | Ye et al. |
| 2007/0035322 A1 | 2/2007 | Kang et al. |
| 2007/0035712 A1 | 2/2007 | Gassner et al. |
| 2007/0035728 A1 | 2/2007 | Kekare et al. |
| 2007/0052963 A1 | 3/2007 | Orbon et al. |
| 2007/0064995 A1 | 3/2007 | Oaki et al. |
| 2007/0133860 A1 | 6/2007 | Lin et al. |
| 2007/0156379 A1 | 7/2007 | Kulkarni et al. |
| 2007/0230770 A1 | 10/2007 | Kulkarni et al. |
| 2007/0248257 A1 | 10/2007 | Bruce et al. |
| 2007/0280527 A1 | 12/2007 | Almogy et al. |
| 2007/0288219 A1 | 12/2007 | Zafar et al. |
| 2008/0013083 A1 | 1/2008 | Kirk et al. |
| 2008/0049994 A1 | 2/2008 | Rognin et al. |
| 2008/0058977 A1 | 3/2008 | Honda |
| 2008/0072207 A1 | 3/2008 | Verma et al. |
| 2008/0081385 A1 | 4/2008 | Marella et al. |
| 2008/0163140 A1 | 7/2008 | Fouquet et al. |
| 2008/0167829 A1 | 7/2008 | Park et al. |
| 2008/0250384 A1 | 10/2008 | Duffy et al. |
| 2008/0295047 A1 | 11/2008 | Nehmadi et al. |
| 2008/0295048 A1* | 11/2008 | Nehmadi et al. ................ 716/4 |
| 2008/0304056 A1 | 12/2008 | Alles et al. |
| 2009/0024967 A1 | 1/2009 | Su et al. |
| 2009/0037134 A1 | 2/2009 | Kulkarni et al. |
| 2009/0041332 A1 | 2/2009 | Bhaskar et al. |
| 2009/0043527 A1 | 2/2009 | Park et al. |
| 2009/0055783 A1 | 2/2009 | Florence et al. |
| 2009/0080759 A1 | 3/2009 | Bhaskar et al. |
| 2009/0210183 A1 | 8/2009 | Rajski et al. |
| 2009/0257645 A1 | 10/2009 | Chen et al. |
| 2009/0284733 A1 | 11/2009 | Wallingford et al. |
| 2009/0290782 A1 | 11/2009 | Regensburger |
| 2009/0299681 A1* | 12/2009 | Chen et al. ................ 702/123 |
| 2010/0142800 A1 | 6/2010 | Pak et al. |
| 2010/0146338 A1 | 6/2010 | Schalick et al. |
| 2010/0150429 A1 | 6/2010 | Jau et al. |
| 2010/0226562 A1 | 9/2010 | Wu et al. |
| 2011/0052040 A1 | 3/2011 | Kuan |
| 2011/0184662 A1 | 7/2011 | Badger et al. |
| 2011/0276935 A1 | 11/2011 | Fouquet et al. |
| 2012/0308112 A1 | 12/2012 | Hu et al. |
| 2012/0319246 A1 | 12/2012 | Tan et al. |
| 2013/0009989 A1* | 1/2013 | Chen et al. ................ 345/629 |
| 2013/0027196 A1* | 1/2013 | Yankun et al. ................ 340/435 |

FOREIGN PATENT DOCUMENTS

| | | |
|---|---|---|
| CN | 1646896 | 7/2005 |
| EP | 0032197 | 7/1981 |
| EP | 0370322 | 5/1990 |
| EP | 1061358 | 12/2000 |
| EP | 1061571 | 12/2000 |
| EP | 1065567 | 1/2001 |
| EP | 1066925 | 1/2001 |
| EP | 1069609 | 1/2001 |
| EP | 1093017 | 4/2001 |
| EP | 1329771 | 7/2003 |
| EP | 1480034 | 11/2004 |
| EP | 1696270 | 8/2006 |
| JP | 7-159337 | 6/1995 |
| JP | 2002-071575 | 3/2002 |
| JP | 2002-365235 | 12/2002 |
| JP | 2003-215060 | 7/2003 |
| JP | 2004-045066 | 2/2004 |
| JP | 2005-283326 | 10/2005 |
| JP | 2009-122046 | 6/2009 |
| KR | 10-2001-0007394 | 1/2001 |
| KR | 10-2001-0037026 | 5/2001 |
| KR | 10-2001-0101697 | 11/2001 |
| KR | 10-2003-0055848 | 7/2003 |
| KR | 10-2006-0075691 | 7/2005 |
| KR | 10-2005-0092053 | 9/2005 |
| KR | 10-2010-0061018 | 6/2010 |
| WO | 98/57358 | 12/1998 |
| WO | 99/22310 | 5/1999 |
| WO | 99/25004 | 5/1999 |
| WO | 99/59200 | 5/1999 |
| WO | 99/38002 | 7/1999 |
| WO | 99/41434 | 8/1999 |
| WO | 00/03234 | 1/2000 |
| WO | 00/36525 | 6/2000 |
| WO | 00/55799 | 9/2000 |
| WO | 00/68884 | 11/2000 |
| WO | 00/70332 | 11/2000 |
| WO | 01/09566 | 2/2001 |
| WO | 01/40145 | 6/2001 |

(56) References Cited

FOREIGN PATENT DOCUMENTS

| WO | 03/104921 | 12/2003 |
|----|-----------|---------|
| WO | 2004/027684 | 4/2004 |
| WO | 2006/012388 | 2/2006 |
| WO | 2006/063268 | 6/2006 |
| WO | 2009/152046 | 9/2009 |
| WO | 2010/093733 | 8/2010 |

OTHER PUBLICATIONS

Jundong Liu, Robust Image Segmentation using Local Median, Proceedings of the 3rd Canadian Conference on Computer and Robot Vision (CRV'06) 0-7695-2542-3/06 $20.00 © 2006 IEEE, 7 pages total.*
International Search Report and Written Opinion for PCT/US2013/021940 mailed Apr. 30, 2013.
U.S. Appl. No. 60/681,095, filed May 13, 2005 by Nehmadi et al.
U.S. Appl. No. 60/684,360, filed May 24, 2005 by Nehmadi et al.
U.S. Appl. No. 13/652,377, filed Oct. 15, 2012 by Wu et al.
Allan et al., "Critical Area Extraction for Soft Fault Estimation," IEEE Transactions on Semiconductor Manufacturing, vol. 11, No. 1, Feb. 1998.
Barty et al., "Aerial Image Microscopes for the inspection of defects in EUV masks," Proceedings of SPIE, vol. 4889, 2002, pp. 1073-1084.
Budd et al., "A New Mask Evaluation Tool, the Microlithography Simulation Microscope Aerial Image Measurement System," SPIE vol. 2197, 1994, pp. 530-540.
Cai et al., "Enhanced Dispositioning of Reticle Defects Using the Virtual Stepper With Automoated Defect Severity Scoring," Proceedings of the SPIE, vol. 4409, Jan. 2001, pp. 467-478.
Comizzoli, "Uses of Corona Discharges in the Semiconductor Industry," J. Electrochem. Soc., 1987, pp. 424-429.
Contactless Electrical Equivalent Oxide Thickness Measurement, IBM Technical Disclosure Bulletin, vol. 29, No. 10, 1987, pp. 4622-4623.
Contactless Photovoltage vs. Bias Method for Determining Flat-Band Voltage, IBM Technical Disclosure Bulletin, vol. 32, vol. 9A, 1990, pp. 14-17.
Cosway et al., "Manufacturing Implementation of Corona Oxide Silicon (COS) Systems for Diffusion Furnace Contamination Monitoring," 1997 IEEE/SEMI Advanced Semiconductor Manufacturing Conference, pp. 98-102.
Diebold et al., "Characterization and produiction metrology of thin transistor gate oxide films," Materials Science in Semiconductor Processing 2, 1999, pp. 103-147.
Dirksen et al., "Impact of high order aberrations on the performance of the aberration monitor," Proc. Of SPIE vol. 4000, Mar. 2000, pp. 9-17.
Dirksen et al., "Novel aberration monitor for optical lithography," Proc. Of SPIE vol. 3679, Jul. 1999, pp. 77-86.
Garcia et al., "New Die to Database Inspection Algorithm for Inspection of 90-nm Node Reticles," Proceedings of SPIE, vol. 5130, 2003, pp. 364-374.
Granik et al., "Sub-resolution process windows and yield estimation technique based on detailed full-chip CD simulation," Mentor Graphics, Sep. 2000, 5 pages.
Hess et al., "A Novel Approach: High Resolution Inspection with Wafer Plane Defect Detection," Proceedings of SPIE—International Society for Optical Engineering; Photomask and Next-Generation Lithography Mask Technology 2008, vol. 7028, 2008.
Huang et al., "Process Window Impact of Progressive Mask Defects, Its Inspection and Disposition Techniques (go/no-go criteria) Via a Lithographic Detector," Proceedings of SPIE—The International Society for Optical Engineering; 25th Annual Bacus Symposium on Photomask Technology 2005, vol. 5992, No. 1, 2005, p. 6.
Huang et al., "Using Design Based Binning to Improve Defect Excursion Control for 45nm Production," IEEE, International Symposium on Semiconductor Manufacturing, Oct. 2007, pp. 1-3.
Hung et al., Metrology Study of Sub 20 Angstrom oxynitride by Corona-Oxide-Silicon (COS) and Conventional C-V Approaches, 2002, Mat. Res. Soc. Symp. Proc., vol. 716, pp. 119-124.
Karklin et al., "Automatic Defect Severity Scoring for 193 nm Reticle Defect Inspection," Proceedings of SPIE—The International Society for Optical Engineering, 2001, vol. 4346, No. 2, pp. 898-906.
Lo et al., "Identifying Process Window Marginalities of Reticle Designs for 0.15/0.13 µm Technologies," Proceedings of SPIE vol. 5130, 2003, pp. 829-837.
Lorusso et al. "Advanced DFM Applns. Using design-based metrology on CDSEM," SPIE vol. 6152, Mar. 27, 2006.
Lu et al., "Application of Simulation Based Defect Printability Analysis for Mask Qualification Control," Proceedings of SPIE, vol. 5038, 2003, pp. 33-40.
Mack, "Lithographic Simulation: A Review," Proceedings of SPIE vol. 4440, 2001, pp. 59-72.
Martino et al., "Application of the Aerial Image Measurement System (AIMS(TM)) to the Analysis of Binary Mask Imaging and Resolution Enhancement Techniques," SPIE vol. 2197, 1994, pp. 573-584.
Miller, "A New Approach for Measuring Oxide Thickness," Semiconductor International, Jul. 1995, pp. 147-148.
Nagpal et al., "Wafer Plane Inspection for Advanced Reticle Defects," Proceedings of SPIE—The International Society for Optical Engineering; Photomask and Next-Generation Lithography Mask Technology. vol. 7028, 2008.
Numerical Recipes in C. The Art of Scientific Computing, 2nd Ed.,© Cambridge University Press 1988, 1992, p. 683.
O'Gorman et al., "Subpixel Registration Using a Concentric Ring Fiducial," Proceedings of the International Conference on Pattern Recognition, vol. ii, Jun. 16, 1990, pp. 249-253.
Otsu, "A Threshold Selection Method from Gray-Level Histograms," IEEE Transactions on Systems, Man, and Cybernetics, vol. SMC-9, No. 1, Jan. 1979, pp. 62-66.
Pang et al., "Simulation-based Defect Printability Analysis on Alternating Phase Shifting Masks for 193 nm Lithography," Proceedings of SPIE, vol. 4889, 2002, pp. 947-954.
Pettibone et al., "Wafer Printability Simulation Accuracy Based on UV Optical Inspection Images of Reticle Defects," Proceedings of SPIE—The International Society for Optical Engineering 1999 Society of Photo-Optical Instrumentation Engineers, vol. 3677, No. II, 1999, pp. 711-720.
Phan et al., "Comparison of Binary Mask Defect Printability Analysis Using Virtual Stepper System and Aerial Image Microscope System," Proceedings of SPIE—The International Society for Optical Engineering 1999 Society of Photo-Optical Instrumentation Engineers, vol. 3873, 1999, pp. 681-692.
Sahouria et al., "Full-chip Process Simulation for Silicon DRC," Mentor Graphics, Mar. 2000, 6 pages.
Sato et al., "Defect Criticality Index (DCI): A new methodology to significantly improve DOI sampling rate in a 45nm production environment," Metrology, Inspection, and Process Control for Microlithography XXII, Proc. Of SPIE vol. 6922, 692213 (2008), pp. 1-9.
Schroder et al., Corona-Oxide-Semiconductor Device Characterization, 1998, Solid-State Electronics, vol. 42, No. 4, pp. 505-512.
Schroder, "Surface voltage and surface photovoltage: history, theory and applications," Measurement Science and Technology, vol. 12, 2001, pp. R16-R31.
Schroder, Contactless Surface Charge Semiconductor Characterization, Apr. 2002, Materials Science and Engineering B, vol. 91-92, pp. 196-228.
Schurz et al., "Simulation Study of Reticle Enhancement Technology Applications for 157 nm Lithography," SPIE vol. 4562, 2002, pp. 902-913.
Svidenko et al. "Dynamic Defect-Limited Yield Prediction by Criticality Factor," ISSM Paper: YE-O-157, 2007.
Tang et al., "Analyzing Volume Diagnosis Results with Statistical Learning for Yield Improvement" 12th IEEE European Test Symposium, Freiburg 2007, IEEE European, May 20-24, 2007, pp. 145-150.
Verkuil et al., "A Contactless Alternative to MOS Charge Measurements by Means of a Corona-Oxide-Semiconductor (COS) Technique," Electrochem. Soc. Extended Abstracts, 1988, vol. 88-1, No. 169, pp. 261-262.

(56) References Cited

OTHER PUBLICATIONS

Verkuil, "Rapid Contactless Method for Measuring Fixed Oxide Charge Associated with Silicon Processing," IBM Technical Disclosure Bulletin, vol. 24, No. 6, 1981, pp. 3048-3053.

Volk et al. "Investigation of Reticle Defect Formation at DUV Lithography," 2002, BACUS Symposium on Photomask Technology.

Volk et al. "Investigation of Reticle Defect Formation at DUV Lithography," 2003, IEEE/SEMI Advanced Manufacturing Conference, pp. 29-35.

Volk et al., "Investigation of Smart Inspection of Critical Layer Reticles using Additional Designer Data to Determine Defect Significance," Proceedings of SPIE vol. 5256, 2003, pp. 489-499.

Weinberg, "Tunneling of Electrons from Si into Thermally Grown SiO2," Solid-State Electronics, 1977, vol. 20, pp. 11-18.

Weinzierl et al., "Non-Contact Corona-Based Process Control Measurements: Where We've Been, Where We're Headed," Electrochemical Society Proceedings, Oct. 1999, vol. 99-16, pp. 342-350.

Yan et al., "Printability of Pellicle Defects in DUV 0.5 um Lithography," SPIE vol. 1604, 1991, pp. 106-117.

\* cited by examiner

SEGMENTATION FOR WAFER INSPECTION

BACKGROUND OF THE INVENTION

1. Field of the Invention

This invention generally relates to segmenting pixels in an image of a wafer for defect detection.

2. Description of the Related Art

The following description and examples are not admitted to be prior art by virtue of their inclusion in this section.

Wafer inspection, using either optical or electron beam technologies, is an important technique for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

In each processing step performed on a semiconductor wafer, the same circuit pattern is printed in each die on the wafer. Most wafer inspection systems take advantage of this fact and use a relatively simple die-to-die comparison to detect defects on the wafer. However, the printed circuit in each die may include many areas of patterned features that repeat in the x or y direction such as the areas of DRAM, SRAM, or FLASH. This type of area is commonly referred to as an array area (the rest of the areas are called random or logic areas). To achieve better sensitivity, advanced inspection systems employ different strategies for inspecting the array areas and the random or logic areas.

Intensity may be used as a feature of segmentation to group similar intensity pixels together. Then, the same set of defect detection parameters are applied to all of the pixels in the same group (intensity-based). However, this method has a number of disadvantages. For example, an intensity-based segmentation algorithm can be used when a geometry feature scatters uniformly. Often, however, this is not enough. For example, in an intensity- or sum-of-intensity-based segmentation, a wafer image can be segmented into a quiet array segment, a noisy page break segment, and a noisy intersection segment. However, defects of interest (DOIs) in a quiet segment can be missed if a quiet segment is misclassified as a noisy segment. Segments can be misclassified when the same cutline between segments leads to different segmentation in training and runtime. Such misclassification of the segments may also be bad for any pre-processing of the image such as that which removes the periodic pattern in the page break area. As such, segmentation based purely on intensity or sum of intensity is prone to instability related to intensity variation from job-to-job during runtime. Therefore, other property-based segmentation is needed.

Another method for segmenting output of a dark field (DF) inspection system is projection-based segmentation (PBS). PBS provides a relatively simple way to separate segments in regions based on the relative projected intensity in the x and y directions. Most of the time, the PBS approach works well. However, since it is used in the pre-processing part of DF wafer inspection algorithms, there are cases when the PBS segmentation result fluctuates along the side of the underlying physical structure pattern, which makes the projection-based segmentation unstable. The direct result is to mis-segment some quiet segments as noisy segments and vice versa. The impact is to cause the defect inspection to be less adaptive to local noise.

An additional method for segmenting output of a dark field inspection system is median intensity-based segmentation (MBS). MBS is more stable than PBS because most of the time the median intensity differences between the array region and page break region are substantial, which provides easier separation between array and page break. However, the segment boundaries from the MBS can be irregular, which might not correlate to the underlying physical structure pattern very well.

Accordingly, it would be advantageous to develop methods and systems for segmenting pixels in an image of a wafer for defect detection that do not have one or more of the disadvantages described above.

SUMMARY OF THE INVENTION

The following description of various embodiments is not to be construed in any way as limiting the subject matter of the appended claims.

One embodiment relates to a computer-implemented method for segmenting pixels in an image of a wafer for defect detection. The method includes determining a statistic for individual pixels based on a characteristic of the individual pixels in an image acquired for a wafer by an inspection system. The method also includes assigning the individual pixels to first segments based on the statistic and detecting one or more edges between the first segments in an image of the first segments. In addition, the method includes generating an edge map by projecting the one or more edges across an area corresponding to the image for the wafer. The method further includes assigning the individual pixels to second segments by applying the first segments and the edge map to the image for the wafer thereby segmenting the image. Defect detection is performed based on the second segments to which the individual pixels are assigned. Steps of the method are performed by a computer system.

Each of the steps of the computer-implemented method described above may be performed as described further herein. The computer-implemented method described above may include any other step(s) of any other method(s) described herein. The computer-implemented method described above may be performed using any of the systems described herein.

Another embodiment relates to a non-transitory computer-readable medium storing program instructions executable on a computer system for performing a method for segmenting pixels in an image of a wafer for defect detection. The method includes the steps of the computer-implemented method described above. The computer-readable medium may be further configured as described herein. The steps of the method may be performed as described further herein. In addition, the method for which the program instructions are executable may include any other step(s) of any other method(s) described herein.

An additional embodiment relates to a system configured to segment pixels in an image of a wafer for defect detection. The system includes an inspection subsystem configured to generate an image for a wafer. The system also includes a computer subsystem configured for performing the steps of the method described above. The system may be further configured as described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

One embodiment relates to a computer-implemented method for segmenting pixels in an image of a wafer for defect detection. The computer-implemented method may include acquiring an image of a wafer generated by an inspection system. Acquiring the image for the wafer may be performed using the inspection system. For example, acquiring the image may include using the inspection system to scan light over the wafer and to generate image(s) responsive to light scattered and/or reflected from the wafer detected by the inspection system during scanning. In this manner, acquiring the image may include scanning the wafer. However, acquiring the image does not necessarily include scanning the wafer. For example, acquiring the image may include acquiring the image from a computer-readable storage medium in which the image has been stored (e.g., by the inspection system). Acquiring the image from the storage medium may be performed in any suitable manner, and the storage medium from which the image is acquired may include any of the storage media described herein. Although in some embodiments described herein, the image acquired for the wafer may be referred to or described as an "image frame," the image for the wafer used in the embodiments described herein may include any image or portion of any image that can be generated or acquired by any wafer inspection system.

The method includes determining a statistic for individual pixels based on a characteristic of the individual pixels in an image acquired for a wafer by an inspection system. In one embodiment, the characteristic is image intensity of the individual pixels. In some embodiments, the statistic is median image intensity of the individual pixels. In this manner, the method may include determining a statistic for each of the individual pixels on a pixel-by-pixel basis even though the statistic for any one pixel may be determined using the characteristic of multiple pixels in the image. For example, the median intensity of one single pixel may be determined based on the image intensity of that pixel as well as the image intensity of the surrounding pixels. The median image intensity may be determined using any suitable method or algorithm. In addition, the characteristic and the statistic may include any other suitable characteristic and statistic of the individual pixels determined in any suitable manner.

The method also includes assigning the individual pixels to first segments based on the statistic. If the statistic is median image intensity as described above, this step may be similar to median intensity-based segmentation (MBS). However, additional steps described herein help to define segment boundaries in MBS with greater accuracy. "Segments" can be generally defined as different portions of an entire range of possible values for the individual pixels. The segments may be defined based on values for the statistic of the individual pixels depending on the defect detection algorithm that uses the segments. For instance, in the multiple die auto-thresholding (MDAT) algorithm, the value for the statistic of the individual pixels that is used to define the first segments may include median intensity value. In one such illustrative and non-limiting example, if the entire range of median intensity values is from 0 to 255, one of the first segments may include median intensity values from 0 to 100 and another of the first segments may include median intensity values from 101 to 255. In this manner, one of the first segments corresponds to darker pixels in the image, and the other of the first segments corresponds to brighter pixels in the image. The first segments used in the embodiments described herein may be determined in any suitable manner, and the individual pixels may be assigned to the first segments using any suitable method and/or algorithm.

In one embodiment, the method includes generating an image showing the statistic determined for the individual pixels, and assigning the individual pixels to the first segments is performed based on the image showing the statistic. For example, the method may include labeling the image for the wafer based on the pixel intensity statistics (e.g., median intensity, range-based, etc.). In addition, although some embodiments are described herein as being based on median intensity, it is to be understood that the embodiments may be based on any statistic first with edge detection as described herein performed later. In one such example shown in FIG. 1, the method may generate image 10 showing the statistic determined for each of the individual pixels as a function of the individual pixels. If the statistic is median image intensity as described above, image 10 shown in FIG. 1 may be a median image for one channel (one detection subsystem or one detector) of the inspection system, and other images may be separately generated for other channels of the inspection system.

Figure 1:
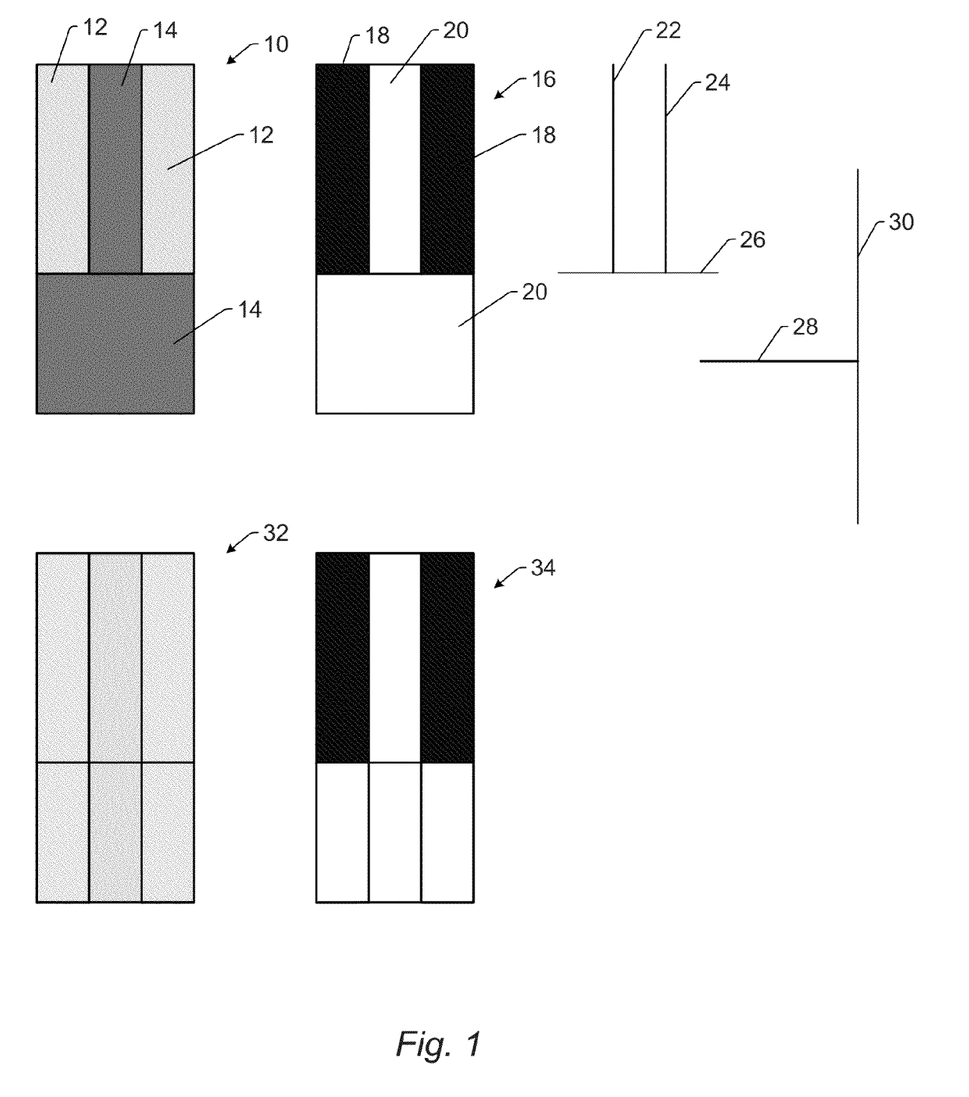
FIG. 1 is a schematic diagram illustrating one embodiment of a computer-implemented method for segmenting pixels in an image of a wafer for defect detection.

That image may then be used for the first segmentation. For example, first segments 12 in image 10 may be defined to include pixels having values for the statistic in one range, and first segments 14 may be defined to include pixels having values for the statistic in another range different from the first. Therefore, the pixels in the image can be separated into first segments based on the statistic. Assigning the pixels to the first segments does not necessarily include generating an image as described above and using the image for the first segmentation may be performed in any other suitable manner.

The method also includes detecting one or more edges between the first segments in an image of the first segments. In some embodiments, the method includes generating the image of the first segments by labeling the individual pixels based on the first segments to which the individual pixels were assigned. For example, as shown in FIG. 1, image 16 of the first segments may be generated by labeling the individual pixels of image 10 based on the first segments to which the individual pixels were assigned. Edge detection may then be applied to the labeled image. In this manner, MBS may be applied to median image 10 to generate image 16 showing the labeled first segments. More specifically, since image 16 includes pixels in two different first segments (first segments 12 and 14), image 16 may be a binary image with one of the first segments (first segments 12) shown as black regions 18 in the image and the other of the first segments (first segments 14) shown as white regions 20 in the image. The image showing the labeled first segments may then be used as a segmentation mask for other steps described herein (e.g., by overlaying it with an image acquired for the wafer such that pixels within the different segments can be identified based on their location within the mask). The image showing the first segments may also be labeled in any other suitable manner (e.g., via color differences, gray level differences, alphanumeric differences, and the like). That image may then be used to detect the edge(s) of the first segments as described further herein.

In one embodiment, the one or more edges include at least one edge that extends in the x direction, at least one edge that extends in the y direction, or a combination of at least one edge that extends in the x direction and at least one edge that extends in the y direction. For example, edge detection may include horizontal and/or vertical edge detection. In one such example, for each pixel (i, j) in an image such as the labeled image described above, edge detection may add 1 to the horizontal edge at the ith location if (i, j−1), (i, j+1) belong to different segments. In addition, edge detection may add 1 to the vertical edge at the jth location if (i−1, j), (i+1, j) belong to different segments. In the example shown in FIG. 1, using image 16, two vertical edges 22 and 24 extending in the y direction may be detected (with respect to horizontal axis 26) and one horizontal edge 28 extending in the x direction may be detected (with respect to vertical axis 30). This is a relatively simple edge detection approach that can be fine-tuned to any specific application, computation consideration, or expense. In addition, edge detection may be performed in a number of other different ways.

In some embodiments, the method includes modifying the one or more detected edges before generating the edge map described further herein based on spatial characteristics of the one or more detected edges. This step may include "pruning" redundant edges. For example, due to physical structure roughness and inspection system resolution limitations, the edge of segments in an image is not always clean cut. Therefore, the edge detection step may detect multiple edges (redundant edges) that are substantially close together around a real physical edge. As such, the one or more detected edges may be modified using, for example, a dilation algorithm to merge (or reduce) the edges that are substantially close to one another into one edge. The dilation algorithm may include any suitable dilation algorithm known in the art.

The method also includes generating an edge map by projecting the one or more edges across an area corresponding to the image for the wafer. In this manner, the methods described herein may perform projection-based segmentation (PBS) based on edge information. For example, as shown in FIG. 1, edge map 32 may be generated as a grid from the edge projection of the horizontal and vertical edges shown in FIG. 1 (edges 22, 24 and 28). Projecting the one or more edges may include extending any edges that were detected and do not extend across the entire image such that they do extend across the entire image. In other words, projecting the edge(s) may include extending an edge along its length such that it spans the entire image area.

Detecting edges based on a statistic-based (e.g., median intensity-based) segment map and then projecting the edge(s) in the x and/or y directions can greatly help to reduce the ambiguity of the edge(s) compared to intensity-based projection. As such, this approach can be used to accurately segment frame images for the underlying structure patterns. The edge detection described herein that can be performed on a segment map and projection based on the edge map is also advantageously stable (with respect to any intensity variations in the light detected from the wafer that is used to form the image for the wafer). For example, an MBS segment map is stable for performing edge detection in x and y. In addition, projection based on the x and y edges is much more stable than edge projection based on other characteristics of the image for the wafer.

The method also includes assigning the individual pixels to second segments by applying the first segments and the edge map to the image for the wafer thereby segmenting the image. Therefore, the embodiments described herein may segment (and label) the frame image based on the edges. The method may segment the pixels based on a combination of image intensity (used to define the first segments that are applied to the image) and intensity change pattern (used to define the edge map that is applied to the image) to accurately segment the underlying structures. For example, even relatively thin vertical areas with relatively low image intensity can be segmented out with the approaches described herein. In addition, edge projection in x and y described herein is substantially stable for reconstructing the segment map (for the second segments).

In one embodiment, assigning the individual pixels to the second segments includes generating the second segments based on the first segments and the edge map and applying the second segments to the individual pixels. For example, the segmentation mask (or image 16 showing the first segments) may be combined with the grid (or edge map 32 showing the edges) to generate second segment groups shown in image 34 in FIG. 1. In this manner, this image shows the second segment groups and may be used as a second segmentation mask as described above. Assigning the individual pixels to the second segments may, however, be performed in any other suitable manner.

Defect detection is performed based on the second segments to which the individual pixels are assigned. For example, the embodiments described herein can be used as pre-processing method(s) to separate regions into different segments, but are not themselves an inspection or defect detection algorithm. The embodiments described herein can be used for pre-processing for any inspection algorithm. In this manner, defect detection may be performed in any suitable manner using any suitable method and/or algorithm.

Steps of the method are performed by a computer system, which may be configured as described further herein.

In one embodiment, assigning the individual pixels to the first segments results in the individual pixels having different levels of noise assigned to different first segments. For example, the methods described herein basically segment low intensity segments from high intensity segments in the form of rectangular bounding boxes. Therefore, the methods described herein essentially separate relatively low noise segments from relatively high noise segments, and the segments having different noise levels can then be processed separately during defect detection such that defects of interest (DOIs) can be detected in each of the segments regardless of the noise levels (e.g., by adjusting a threshold that is applied to the pixels), which also suppresses nuisance, noise, and background signal detection.

In another embodiment, at least one of the first segments corresponds to a region on the wafer containing structures having a first characteristic, and at least another of the first segments corresponds to a region on the wafer containing structures having a second characteristic that is different than the first characteristic. For example, since wafer structures that have different characteristics will affect the light from the wafer detected by the inspection system in different ways and since the first segments may be defined based on a statistic related to the image of the wafer (e.g., median image intensity), the first segments can be used to separate different regions of the wafer containing different structures. In addition, since the first segments are defined based on a statistic of a characteristic of the individual pixels, instead of the characteristic itself, the first segments can be used to separate the regions with relatively high accuracy.

In some embodiments, at least one of the second segments corresponds to a region on the wafer containing structures having a first characteristic, and at least another of the second segments corresponds to a region on the wafer containing structures having a second characteristic that is different than the first characteristic. For example, since the second segments are based, at least in part, on the first segments and since different first segments may, as described above, correspond to different regions containing structures having different characteristics, the second segments may also correspond to different regions containing structures having different characteristics.

In one embodiment, at least one of the first segments corresponds to a page break region of a device being fabricated on the wafer, and at least another of the first segments corresponds to an array region of the device. Page breaks are generally defined in the art as regions of a die separating substantially continuous regions of physical memory. Each of the continuous regions of physical memory may be commonly referred to as a page frame. Inside a dark field array region, there is no substantial feature difference and therefore no substantial intensity difference, only some background noise. However, since the page breaks include dramatically different structures than the array regions, there will be a substantial intensity difference in the image for the page breaks compared to the array regions. Therefore, the embodiments can separate an array segment from a page break segment. As described further herein, median intensity may be the statistic of the characteristic of the individual pixels that is used to assign the individual pixels to the first segments. Using median intensity as described herein is advantageous because it is stable for differentiating array from page break in terms of intensity difference.

In some embodiments, at least one of the second segments corresponds to a page break region of a device being fabricated on the wafer, and at least another of the second segments corresponds to an array region of the device. For example, since the second segments are based, at least in part, on the first segments and since some of the first segments may, as described above, correspond to page break regions while other first segments may correspond to array regions, some of the second segments may also correspond to page break regions and other second segments may correspond to array regions.

In one embodiment, the method is performed during scanning of the wafer by the inspection system. For example, as image frames are acquired for a wafer during scanning, the method may be performed for each or at least some of the image frames. In this manner, the method may be performed in real time during inspection by a computer subsystem of an inspection system, which may be configured as described further herein.

In another embodiment, the image for the wafer includes one of multiple image frames acquired sequentially for different areas on the wafer during scanning of the wafer by the inspection system. For example, a detector or detection subsystem of the inspection system may capture multiple image frames as the wafer is moved relative to the inspection system or vice versa. Therefore, the image frames may be acquired at different positions on the wafer. The method described herein may be performed for any or all of those image frames. For example, in one such embodiment, the method is performed for more than one of the multiple image frames. In this manner, the method may be performed independently and separately for each image frame on a frame-by-frame basis.

In some embodiments, the image for the wafer includes one of multiple image frames acquired simultaneously for one area on the wafer by multiple detection subsystems of the inspection system, and the method includes assigning individual pixels in at least one other of the multiple image frames to the second segments by applying the first segments and the edge map to the at least one other of the multiple image frames. For example, the segmentation result generated using any one frame image can be applied to image frames across other detection subsystems (or "channels") of the inspection system for the same job. In this manner, the segmentation determined for image frames generated by one channel may, in some instances, be applied to an image frame generated by another channel.

In some embodiments, the inspection system is a dark field inspection system. Therefore, the embodiments described herein may be used for segmentation on a dark field inspection system, which may be configured as described further herein. In addition, the embodiments described herein improve the accuracy, stability, and ease of use of the segmentation of wafer images produced by a dark field scanning inspection system. However, the embodiments described herein are not specific to a particular wafer or layer or a specific inspection system. For example, the method may be used to segment any images, no matter what kind of inspection system was used to acquire the images.

The method may also include storing results of any of the step(s) of the method in a computer-readable storage medium. The results may include any of the results described herein and may be stored in any manner known in the art. The storage medium may include any suitable storage medium known in the art. After the results have been stored, the results can be accessed in the storage medium and used as described herein, formatted for display to a user, used by another software module, method, or system, etc.

Figure 2:
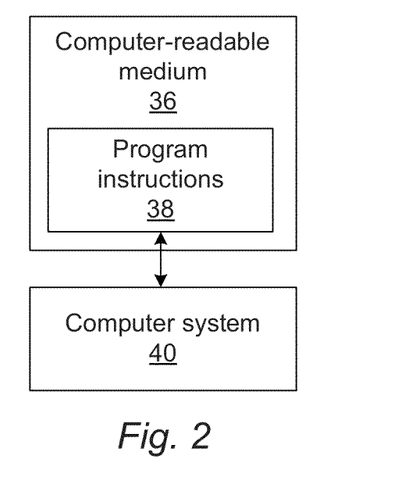
FIG. 2 is a block diagram illustrating one embodiment of a non-transitory computer-readable medium that includes program instructions executable on a computer system for performing one or more of the method embodiments described herein.

Another embodiment relates to a non-transitory computer-readable medium storing program instructions executable on a computer system for performing a method (i.e., a computer-implemented method) for segmenting pixels in an image of a wafer for defect detection. One such embodiment is shown in FIG. 2. For example, as shown in FIG. 2, computer-readable medium 36 stores program instructions 38 executable on computer system 40 for performing the method described above. The computer-implemented method for which the program instructions are executable may include any other step(s) of any other method(s) described herein.

Program instructions 38 implementing methods such as those described herein may be stored on computer-readable medium 40. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans. Microsoft Foundation Classes ("MFC"), or other technologies or methodologies, as desired.

Computer system 40 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 3:
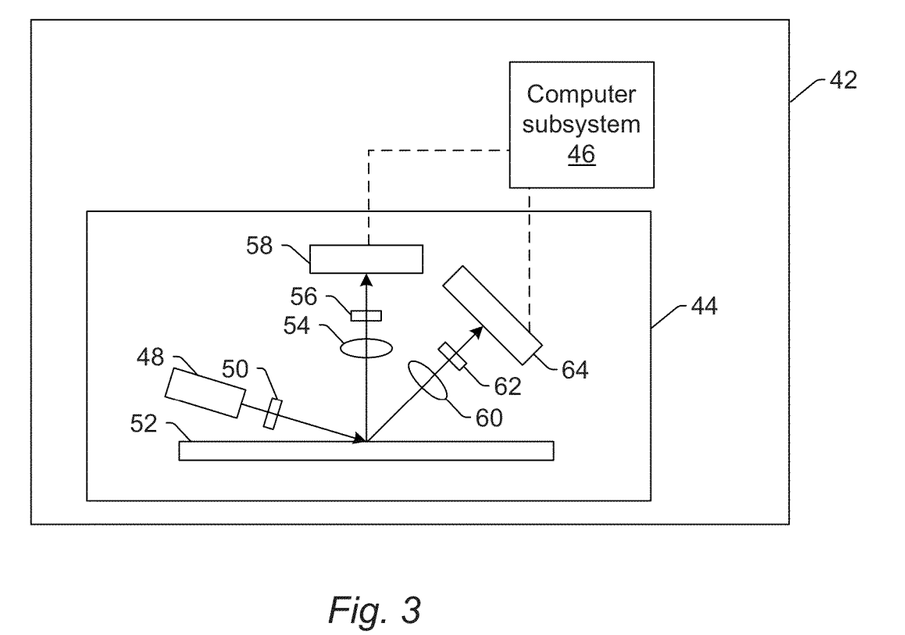
FIG. 3 is a schematic diagram illustrating a side view of one embodiment of a system configured to segment pixels in an image of a wafer for defect detection.

An additional embodiment relates to a system configured to segment pixels in an image of a wafer for defect detection. One embodiment of such a system is shown in FIG. 3. As shown in FIG. 3, system 42 includes inspection subsystem 44 and computer subsystem 46. The inspection subsystem is configured to generate an image for a wafer. For example, as shown in FIG. 3, the inspection subsystem includes light source 48 such as a laser. Light source 48 is configured to direct light to polarizing component 50. In addition, the inspection subsystem may include more than one polarizing component (not shown), each of which may be positioned independently in the path of the light from the light source. Each of the polarizing components may be configured to alter the polarization of the light from the light source in a different manner. The inspection subsystem may be configured to move the polarizing components into and out of the path of the light from the light source in any suitable manner depending on which polarization setting is selected for illumination of the wafer during a scan. The polarization setting used for the illumination of the wafer during a scan may include p-polarized (P), s-polarized (S), or circularly polarized (C).

Light exiting polarizing component 50 is directed to wafer 52 at an oblique angle of incidence, which may include any suitable oblique angle of incidence. The inspection subsystem may also include one or more optical components (not shown) that are configured to direct light from light source 48 to polarizing component 50 or from polarizing component 50 to wafer 52. The optical components may include any suitable optical components known in the art such as, but not limited to, a reflective optical component. In addition, the light source, the polarizing component, and/or the one or more optical components may be configured to direct the light to the wafer at one or more angles of incidence (e.g., an oblique angle of incidence and/or a substantially normal angle of incidence). The inspection subsystem may be configured to perform the scanning by scanning the light over the wafer in any suitable manner.

Light scattered from wafer 52 may be collected and detected by multiple channels of the inspection subsystem during scanning. For example, light scattered from wafer 52 at angles relatively close to normal may be collected by lens 54. Lens 54 may include a refractive optical element as shown in FIG. 3. In addition, lens 54 may include one or more refractive optical elements and/or one or more reflective optical elements. Light collected by lens 54 may be directed to polarizing component 56, which may include any suitable polarizing component known in the art. In addition, the inspection subsystem may include more than one polarizing component (not shown), each of which may be positioned independently in the path of the light collected by the lens. Each of the polarizing components may be configured to alter the polarization of the light collected by the lens in a different manner. The inspection subsystem may be configured to move the polarizing components into and out of the path of the light collected by the lens in any suitable manner depending on which polarization setting is selected for detection of the light collected by lens 54 during scanning. The polarization setting used for the detection of the light collected by lens 54 during scanning may include any of the polarization settings described herein (e.g., P, S, and unpolarized (N)).

Light exiting polarizing component 56 is directed to detector 58. Detector 58 may include any suitable detector known in the art such as a charge coupled device (CCD) or another type of imaging detector. Detector 58 is configured to generate an image that is responsive to the scattered light collected by lens 54 and transmitted by polarizing component 56 if positioned in the path of the collected scattered light. Therefore, lens 54, polarizing component 56 if positioned in the path of the light collected by lens 54, and detector 58 form one channel of the inspection subsystem. This channel of the inspection subsystem may include any other suitable optical components (not shown) known in the art such as a Fourier filtering component.

Light scattered from wafer 52 at different angles may be collected by lens 60. Lens 60 may be configured as described above. Light collected by lens 60 may be directed to polarizing component 62, which may include any suitable polarizing component known in the art. In addition, the inspection subsystem may include more than one polarizing component (not shown), each of which may be positioned independently in the path of the light collected by the lens. Each of the polarizing components may be configured to alter the polarization of the light collected by the lens in a different manner. The inspection subsystem may be configured to move the polarizing components into and out of the path of the light collected by the lens in any suitable manner depending on which polarization setting is selected for detection of the light collected by lens 60 during scanning. The polarization setting used for detection of the light collected by lens 60 during scanning may include P, S, or N.

Light exiting polarizing component 62 is directed to detector 64, which may be configured as described above. Detector 64 is also configured to generate an image that is responsive to the collected scattered light that passes through polarizing component 62 if positioned in the path of the scattered light. Therefore, lens 60, polarizing component 62 if positioned in the path of the light collected by lens 60, and detector 64 may form another channel of the inspection subsystem. This channel may also include any other optical components (not shown) described above. In some embodiments, lens 60 may be configured to collect light scattered from the wafer at polar angles from about 20 degrees to about 70 degrees. In addition, lens 60 may be configured as a reflective optical component (not shown) that is configured to collect light scattered from the wafer at azimuthal angles of about 360 degrees.

The inspection subsystem shown in FIG. 3 may also include one or more other channels (not shown). For example, the inspection subsystem may include an additional channel, which may include any of the optical components described herein such as a lens, one or more polarizing components, and a detector, configured as a side channel. The lens, the one or more polarizing components, and the detector may be further configured as described herein. In one such example, the side channel may be configured to collect and detect light that is scattered out of the plane of incidence (e.g., the side channel may include a lens, which is centered in a plane that is substantially perpendicular to the plane of incidence, and a detector configured to detect light collected by the lens).

Computer subsystem 46 is configured to acquire the image (s) generated by the inspection subsystem. For example, image(s) generated by the detectors during scanning may be provided to computer subsystem 46. In particular, the computer subsystem may be coupled to each of the detectors (e.g., by one or more transmission media shown by the dashed lines in FIG. 3, which may include any suitable transmission media known in the art) such that the computer subsystem may receive the image(s) generated by the detectors. The computer subsystem may be coupled to each of the detectors in any suitable manner. The image(s) generated by the detectors during scanning of the wafer may include any of the image(s) described herein.

The computer subsystem is configured for performing the steps of the method described herein. The computer subsystem may also be configured to perform any other step(s) of any method embodiment(s) described herein. The computer subsystem, the inspection subsystem, and the system may be further configured as described herein.

It is noted that FIG. 3 is provided herein to generally illustrate one configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the Puma 90xx, 91xx, and 93xx series of tools that are commercially available from KLA-Tencor, Milpitas, Calif. For some such systems, the methods described herein may be provided as optional functionality of the system (e.g., in addition to other functionality of the system). Alternatively, the system described herein may be designed "from scratch" to provide a completely new system.

Further modifications and alternative embodiments of various aspects of the invention will be apparent to those skilled in the art in view of this description. For example, methods and systems for segmenting pixels in an image of a wafer for defect detection are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for segmenting pixels in an image of a wafer for defect detection, comprising:
    determining a statistic for individual pixels based on a characteristic of the individual pixels in an image acquired for a wafer by an inspection system;
    assigning the individual pixels to first segments based on the statistic;
    detecting one or more edges between the first segments in an image of the first segments;
    generating an edge map by projecting the one or more edges across an area corresponding to the image for the wafer; and
    assigning the individual pixels to second segments by applying the first segments and the edge map to the image for the wafer thereby segmenting the image, wherein defect detection is performed based on the second segments to which the individual pixels are assigned, and wherein steps of the method are performed by a computer system.

2. The method of claim 1, wherein the characteristic is image intensity of the individual pixels.

3. The method of claim 1, wherein the statistic is median image intensity of the individual pixels.

4. The method of claim 1, further comprising generating an image showing the statistic determined for the individual pixels, wherein assigning the individual pixels to the first segments is performed based on the image showing the statistic.

5. The method of claim 1, further comprising generating the image of the first segments by labeling the individual pixels based on the first segments to which the individual pixels were assigned.

6. The method of claim 1, wherein the one or more edges comprise at least one edge that extends in the x direction, at least one edge that extends in the y direction, or a combination of at least one edge that extends in the x direction and at least one edge that extends in the y direction.

7. The method of claim 1, further comprising modifying the one or more detected edges before said generating based on spatial characteristics of the one or more detected edges.

8. The method of claim 1, wherein assigning the individual pixels to the second segments comprises generating the second segments based on the first segments and the edge map and applying the second segments to the individual pixels.

9. The method of claim 1, wherein assigning the individual pixels to the first segments results in the individual pixels having different levels of noise assigned to different first segments.

10. The method of claim 1, wherein at least one of the first segments corresponds to a region on the wafer containing structures having a first characteristic, and wherein at least another of the first segments corresponds to a region on the wafer containing structures having a second characteristic that is different than the first characteristic.

11. The method of claim 1, wherein at least one of the second segments corresponds to a region on the wafer containing structures having a first characteristic, and wherein at least another of the second segments corresponds to a region on the wafer containing structures having a second characteristic that is different than the first characteristic.

12. The method of claim 1, wherein at least one of the first segments corresponds to a page break region of a device being fabricated on the wafer, and wherein at least another of the first segments corresponds to an array region of the device.

13. The method of claim 1, wherein at least one of the second segments corresponds to a page break region of a device being fabricated on the wafer, and wherein at least another of the second segments corresponds to an array region of the device.

14. The method of claim 1, wherein the method is performed during scanning of the wafer by the inspection system.

15. The method of claim 1, wherein the image for the wafer comprises one of multiple image frames acquired sequentially for different areas on the wafer during scanning of the wafer by the inspection system.

16. The method of claim 1, wherein the image for the wafer comprises one of multiple image frames acquired sequentially for different areas on the wafer during scanning of the wafer by the inspection system, and wherein the method is performed for more than one of the multiple image frames.

17. The method of claim 1, wherein the image for the wafer comprises one of multiple image frames acquired simultaneously for one area on the wafer by multiple detection subsystems of the inspection system, and wherein the method further comprises assigning individual pixels in at least one other of the multiple image frames to the second segments by applying the first segments and the edge map to the at least one other of the multiple image frames.

18. The method of claim 1, wherein the inspection system is a dark field inspection system.

19. A non-transitory computer-readable medium storing program instructions executable on a computer system for performing a method for segmenting pixels in an image of a wafer for defect detection, wherein the method comprises:
   determining a statistic for individual pixels based on a characteristic of the individual pixels in an image acquired for a wafer by an inspection system;
   assigning the individual pixels to first segments based on the statistic;
   detecting one or more edges between the first segments in an image of the first segments;
   generating an edge map by projecting the one or more edges across an area corresponding to the image for the wafer; and
   assigning the individual pixels to second segments by applying the first segments and the edge map to the image for the wafer thereby segmenting the image, wherein defect detection is performed based on the second segments to which the individual pixels are assigned.

20. A system configured to segment pixels in an image of a wafer for defect detection, comprising:
   an inspection subsystem configured to generate an image for a wafer; and
   a computer subsystem configured for:
      determining a statistic for individual pixels based on a characteristic of the individual pixels in the image for the wafer;
      assigning the individual pixels to first segments based on the statistic;
      detecting one or more edges between the first segments in an image of the first segments;
      generating an edge map by projecting the one or more edges across an area corresponding to the image for the wafer; and
      assigning the individual pixels to second segments by applying the first segments and the edge map to the image for the wafer thereby segmenting the image, wherein defect detection is performed based on the second segments to which the individual pixels are assigned.

* * * * *